US012649512B2

(12) United States Patent
Kodera

(10) Patent No.: US 12,649,512 B2
(45) Date of Patent: Jun. 9, 2026

(54) STEERING CONTROL DEVICE AND STEERING CONTROL METHOD

(71) Applicant: JTEKT CORPORATION, Kariya (JP)

(72) Inventor: Takashi Kodera, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 7 days.

(21) Appl. No.: 18/832,567

(22) PCT Filed: Feb. 3, 2022

(86) PCT No.: PCT/JP2022/004261
§ 371 (c)(1),
(2) Date: Jul. 24, 2024

(87) PCT Pub. No.: WO2023/148885
PCT Pub. Date: Aug. 10, 2023

(65) Prior Publication Data
US 2025/0153765 A1 May 15, 2025

(51) Int. Cl.
*B62D 5/00* (2006.01)
(52) U.S. Cl.
CPC .................................... *B62D 5/006* (2013.01)
(58) Field of Classification Search
CPC ....... B62D 5/006; B62D 5/0466; B62D 6/008
See application file for complete search history.

(56) References Cited

U.S. PATENT DOCUMENTS

| | | |
|---|---|---|
| 2008/0230300 A1 | 9/2008 | Hara et al. |
| 2013/0049652 A1 | 2/2013 | Namikawa et al. |
| 2014/0343794 A1 | 11/2014 | Tamaizumi et al. |

| | | | |
|---|---|---|---|
| 2015/0353124 A1* | 12/2015 | Chai ...................... B62D 6/008 |
| | | | 701/41 |
| 2016/0347359 A1 | 12/2016 | Ueyama et al. |
| 2019/0233004 A1 | 8/2019 | Kodera |
| 2019/0367079 A1* | 12/2019 | Kodera ................. B62D 6/002 |
| 2021/0016827 A1* | 1/2021 | Suzuki ................ B62D 5/0481 |
| 2021/0309292 A1 | 10/2021 | Suzuki |

FOREIGN PATENT DOCUMENTS

| | | |
|---|---|---|
| JP | 2006-159963 A | 6/2006 |
| JP | 2010-163091 A | 7/2010 |
| JP | 2013-046436 A | 3/2013 |

(Continued)

OTHER PUBLICATIONS

Apr. 26, 2022 International Search Report issued in International Patent Application No. PCT/JP2022/004261.

(Continued)

*Primary Examiner* — Xiao En Mo

(74) *Attorney, Agent, or Firm* — Oliff PLC

(57) ABSTRACT

A steering control device is configured to execute torque feedback processing, operation processing, and characteristics changing processing. The torque feedback processing includes processing of calculating a manipulated variable for controlling a steering torque to a target steering torque by feedback control, the operation processing is processing of operating a drive circuit of a motor based on the manipulated variable, and the characteristics changing processing is processing of changing response characteristics of the feedback control in accordance with an operation state of an operating member.

15 Claims, 10 Drawing Sheets

(56) References Cited

FOREIGN PATENT DOCUMENTS

| | | | |
|---|---|---|---|
| JP | 2014-223832 | A | 12/2014 |
| JP | 2015-003549 | A | 1/2015 |
| JP | 2015-199415 | A | 11/2015 |
| JP | 2016-222094 | A | 12/2016 |
| JP | 2019-131073 | A | 8/2019 |
| JP | 2020-185918 | A | 11/2020 |

OTHER PUBLICATIONS

Apr. 16, 2025 Partial Supplementary European Search Report issued in European Patent Application No. 22924586.5.
Sep. 11, 2025 Extended European Search Report issued in European Patent Application No. 22924586.5.

* cited by examiner

STEERING CONTROL DEVICE AND STEERING CONTROL METHOD

CROSS-REFERENCE TO RELATED APPLICATIONS

This application is national stage application of International Application No. PCT/JP2022/004261, filed on Feb. 3, 2022, which designates the United States, the entire contents of which are incorporated herein by reference.

TECHNICAL FIELD

The present disclosure relates to a steering control device.

BACKGROUND ART

Patent Document 1 listed below describes a control device that executes feedback control in order to control steering torque, which is torque to be applied to a steering wheel, to a target value, for example.

RELATED ART DOCUMENTS

Patent Documents

Patent Document 1: Japanese Unexamined Patent Application Publication No. 2014-223832 (JP 2014-223832 A)

SUMMARY OF THE INVENTION

Problem to be Solved by the Invention

In a case of performing the above feedback control for torque, an issue is to achieve both stability and responsivity.

Means for Solving the Problem

An aspect of the present disclosure provides a steering control device configured to operate a motor mechanically linked to an operating member that is operated by a driver to steer a vehicle. The steering control device is configured to execute torque feedback processing, operation processing, and characteristics changing processing, the torque feedback processing includes processing of calculating a manipulated variable for controlling a steering torque to a target steering torque by feedback control, the steering torque is torque input to the operating member, the operation processing is processing of operating a drive circuit of the motor based on the manipulated variable, and the characteristics changing processing is processing of changing response characteristics of the feedback control in accordance with an operation state of the operating member.

BRIEF DESCRIPTION OF THE DRAWINGS

FIG. 4A is a time chart showing response characteristics of the first embodiment, FIG. 4B is a time chart showing response characteristics of the first embodiment and a comparative example.

MODES FOR CARRYING OUT THE INVENTION

First Embodiment

A first embodiment of a steering control device will be described below with reference to the drawings.
"Prerequisite Configuration"

Figure 1:
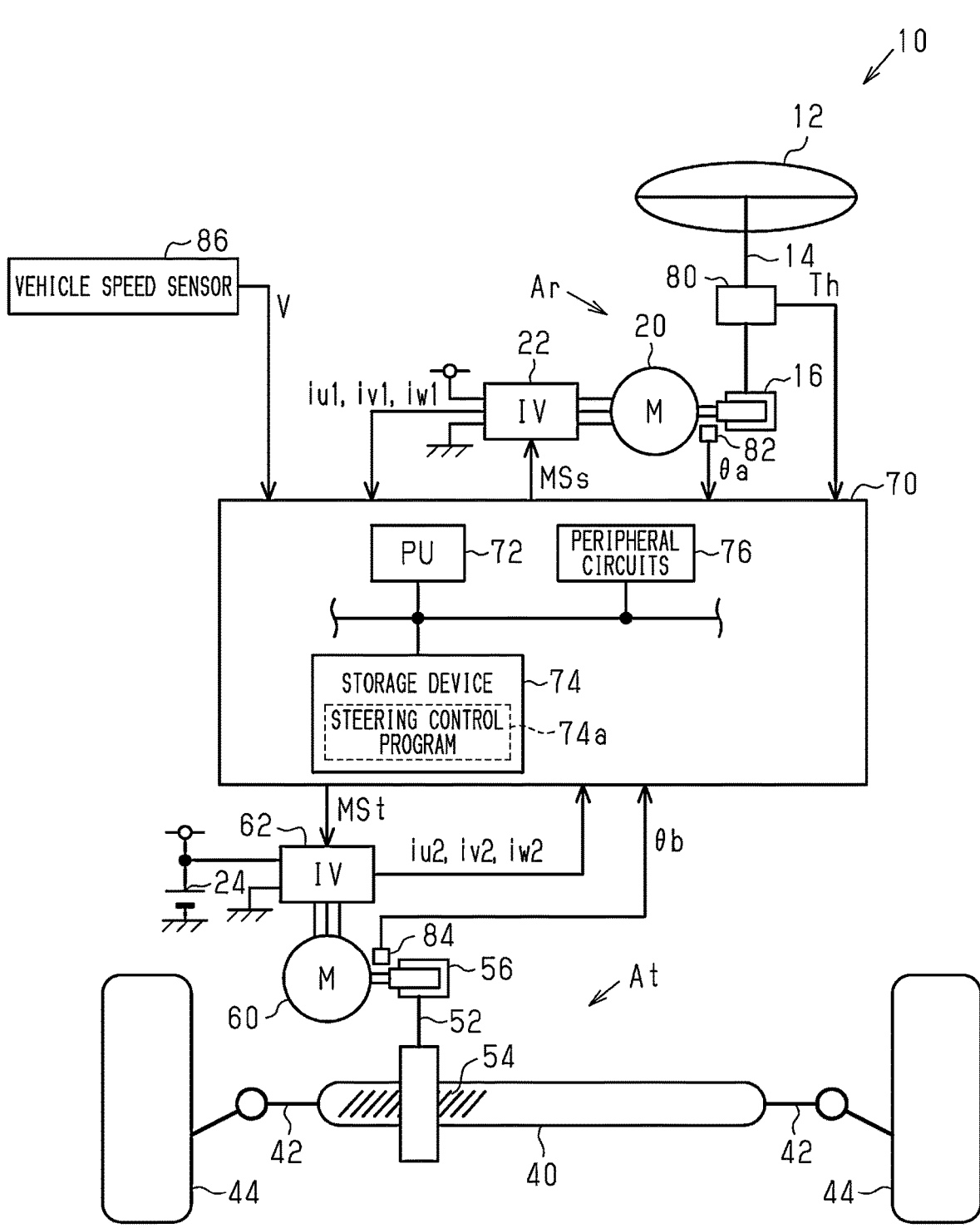
FIG. 1 is a diagram illustrating a configuration of a steering system according to a first embodiment.

As illustrated in FIG. 1, a steering system 10 of a vehicle includes a reaction force actuator Ar and a steering actuator At. The steering system 10 according to the present embodiment has a structure in which a power transmission path between a steering wheel 12 and steered wheels 44 is mechanically disconnected. That is to say, the steering system 10 includes a steer-by-wire steering device.

A steering shaft 14 is linked to the steering wheel 12. The reaction force actuator Ar is an actuator that applies a steering reaction force to the steering wheel 12. The steering reaction force refers to a force that acts in a direction that is opposite to a direction in which the steering wheel 12 is operated by a driver. A suitable tactile response can be given to the driver by applying the steering reaction force to the steering wheel 12. The reaction force actuator Ar includes a speed reduction mechanism 16, a reaction force motor 20, and a reaction force inverter 22.

The reaction force motor 20 is a three-phase brushless motor. The reaction force motor 20 is a surface permanent magnet synchronous motor. A rotation shaft of the reaction force motor 20 is linked to the steering shaft 14 via the speed reduction mechanism 16. The reaction force inverter 22 is a power conversion circuit that converts a voltage of a battery 24, which is a direct-current voltage source, into an alternating-current voltage and performs application thereof to the reaction force motor 20.

On the other hand, a steered shaft 40 extends along a vehicle width direction, which is a right-left direction in FIG. 1. Right and left steered wheels 44 are linked to both ends of the steered shaft 40 via respective tie rods 42. The steered angle of the steered wheels 44 is changed by the steered shaft 40 performing linear motion.

The steering actuator At includes a speed reduction mechanism 56, a steering motor 60, and a steering inverter 62. The steering motor 60 is a three-phase brushless motor. A rotation shaft of the steering motor 60 is linked to a pinion shaft 52 via the speed reduction mechanism 56. Pinion teeth of the pinion shaft 52 are meshed with rack teeth 54 of the steered shaft 40. The pinion shaft 52 and the steered shaft 40 provided with the rack teeth 54 make up a rack and pinion mechanism. Torque of the steering motor 60 is applied as a steering force to the steered shaft 40 via the pinion shaft 52. As the steering motor 60 is rotated, the steered shaft 40 is moved along the vehicle width direction, which is the right-left direction in FIG. 1.

The steering system 10 includes a control device 70. The steering device is an object of control of the control device 70. More specifically, the steering wheel 12 of the steering device is an object of the control device 70. The control device 70 operates the reaction force actuator Ar in order to control the steering reaction force, which is a control amount that is an object of control. In FIG. 1, an operation signal MSs to the reaction force inverter 22 is indicated. Also, the steered wheels 44 of the steering device are objects of control of the control device 70. The control device 70 operates the steering actuator At in order to control the steered angle of the steered wheels 44, which is a control amount that is an object of control. The steered angle is a turning angle of tires. In FIG. 1, an operation signal MSt to the steering inverter 62 is indicated.

The control device 70 references steering torque Th, which is torque input to the steering shaft 14, detected by a torque sensor 80 in order to control the control amount. The torque sensor 80 includes a torsion bar linked to the steering shaft 14, and a sensing element that detects a torsion angle of the torsion bar. The control device 70 also references a rotational angle $\theta a$ of the rotation shaft of the reaction force motor 20 that is detected by a rotational angle sensor 82. The control device 70 also references currents iu1, iv1, and iw1 that flow through the reaction force motor 20. The currents iu1, iv1, and iw1 are quantified as voltage drop amounts across shunt resistors provided in respective legs of the reaction force inverter 22. The control device 70 references a rotational angle $\theta b$ of the rotation shaft of the steering motor 60, detected by a rotational angle sensor 84, in order to control the control amount. The control device 70 also references currents iu2, iv2, and iw2 that flow through the steering motor 60. The currents iu2, iv2, and iw2 are quantified as voltage drop amounts across shunt resistors provided in respective legs of the steering inverter 62. The control device 70 also references a vehicle speed V detected by a vehicle speed sensor 86.

The control device 70 includes a PU 72, a storage device 74, and peripheral circuits 76. The PU 72 is a software processing device such as a CPU, a GPU, a TPU, and so forth. The storage device 74 includes a storage medium, such as non-volatile memory that is electrically rewritable, a disk medium, and so forth. The storage device 74 stores a steering control program 74a. The peripheral circuits 76 include a circuit that generates a clock signal stipulating internal operations, a power supply circuit, a reset circuit, and so forth. The control device 70 controls the control amounts by the PU 72 executing the steering control program 74a stored in the storage device 74.

"Control"

Figure 2:
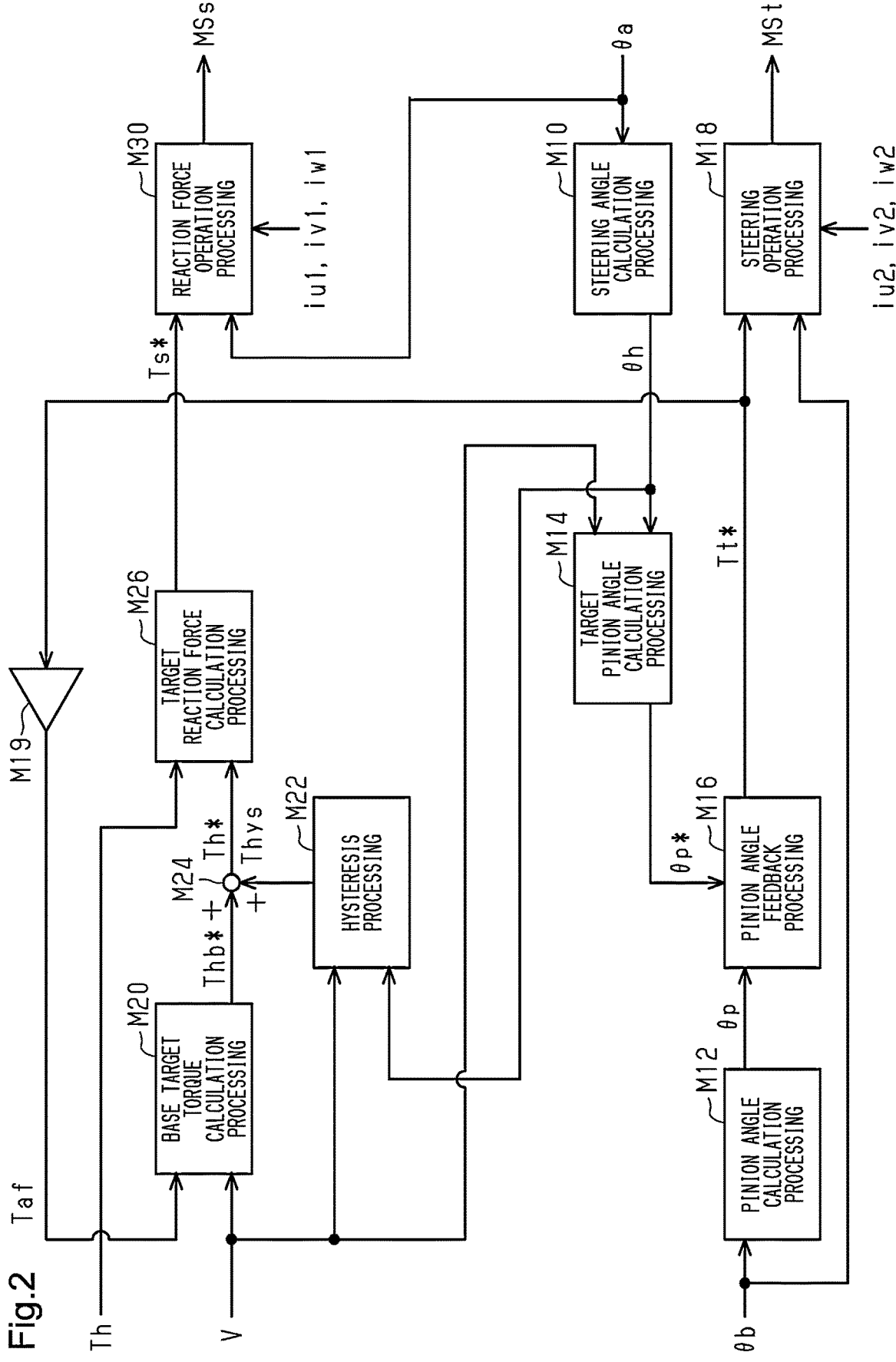
FIG. 2 is a block diagram illustrating processing executed by a control device according to the first embodiment.

FIG. 2 illustrates a part of processing executed by the control device 70.

Steering angle calculation processing M10 is processing of calculating a steering angle $\theta h$, which is a rotational angle of the steering wheel 12, taking the rotational angle $\theta a$ as input. The steering angle calculation processing M10 includes processing of converting the rotational angle $\theta a$ into a cumulative angle including a range exceeding 360°, by counting the number of revolutions of the reaction force motor 20 from a neutral steering position that is the position of the steering wheel 12 when the vehicle is traveling straight, for example. The steering angle calculation processing M10 includes processing of computing the steering angle $\theta h$ by multiplying the cumulative angle obtained through conversion by a conversion coefficient based on a rotational speed ratio of the speed reduction mechanism 16. Note that the steering angle $\theta h$ is positive in a case of an angle on the right side with respect to the neutral steering position, and is negative in a case of an angle on the left side thereof, for example.

Pinion angle calculation processing M12 is processing of calculating a pinion angle $\theta p$ that is the rotational angle of the pinion shaft 52, using the rotational angle $\theta b$ as input. The pinion angle calculation processing M12 includes processing of converting the rotational angle $\theta b$ into a cumulative angle including a range exceeding 360°, by counting the number of revolutions of the steering motor 60 from a neutral rack position that is the position of the steered shaft 40 when the vehicle is traveling straight, for example. The pinion angle calculation processing M12 includes processing of computing the pinion angle $\theta p$ as the actual rotational angle of the pinion shaft 52, by multiplying the cumulative angle obtained through conversion by a conversion coefficient based on a rotational speed ratio of the speed reduction mechanism 56. Note that the pinion angle $\theta p$ is positive in a case of an angle on the right side with respect to the neutral rack position, and is negative in a case of an angle on the left side thereof, for example. The steering motor 60 and the pinion shaft 52 operate in conjunction with each other via the speed reduction mechanism 56. Therefore, there is a one-to-one correspondence relation between a cumulative value of the rotational angle $\theta b$ of the steering motor 60, and the pinion angle $\theta p$. The pinion angle $\theta p$ can be obtained from the rotational angle $\theta b$ of the steering motor 60 using this correspondence relation. Also, the pinion shaft 52 meshes with the steered shaft 40. Accordingly, there is also a one-to-one correspondence relation between the pinion angle $\theta p$ and an amount of movement of the steered shaft 40. Thus, there is also a one-to-one correspondence relation between the pinion angle $\theta p$ and the steered angle of the steered wheels 44.

Target pinion angle calculation processing M14 is processing of calculating a target pinion angle $\theta p^*$ using the steering angle $\theta h$ and the vehicle speed V as inputs. The target pinion angle $\theta p^*$ is a target value for the pinion angle $\theta p$ in accordance with operations of the steering wheel 12 by the driver. The target pinion angle calculation processing M14 includes processing of variably setting a steering angle ratio Dr in accordance with the vehicle speed V. Accordingly, values of the target pinion angle $\theta p^*$ output from the target pinion angle calculation processing M14 vary in accordance with the vehicle speed V, even when the steering angle $\theta h$ that is input is the same.

Pinion angle feedback processing M16 is processing of calculating a steering torque command value Tt* that is a command value for torque of the steering motor 60, in order to control the pinion angle $\theta p$ to the target pinion angle $\theta p^*$ through feedback control.

Steering operation processing M18 is processing of outputting the operation signal MSt for the steering inverter 62 using the steering torque command value Tt*, the currents iu2, iv2, and iw2, and the rotational angle $\theta b$ as inputs. The steering operation processing M18 includes processing of calculating dq-axis current command values based on the steering torque command value Tt*. The steering operation processing M18 also includes processing of calculating dq-axis currents based on the currents iu2, iv2, iw2 and the rotational angle $\theta b$. The steering operation processing M18 further includes processing of calculating the operation signal MSt in order to operate the steering inverter 62 such that the dq-axis currents are brought to the command values.

Axial force calculation processing M19 includes processing of calculating an axial force Taf using the steering torque command value Tt* as an input. Here, the axial force Taf is a force in the axial direction applied to the steered shaft 40. Base target torque calculation processing M20 is processing of calculating base target torque Thb* that is a base value of target steering torque Th* to be input to the steering shaft 14 by the driver via the steering wheel 12, based on the axial force Taf. Here, the axial force Taf is a force in the axial direction applied to the steered shaft 40. The axial force Taf is a quantity in accordance with a lateral force acting on the steered wheels 44, and accordingly the lateral force can be comprehended from the axial force Taf. On the other hand, torque to be input to the steering shaft 14 by the driver via the steering wheel 12 is preferably determined in accordance with the lateral force. Thus, the base target torque calculation processing M20 is processing of calculating the base target torque Thb* in accordance with the lateral force comprehended from the axial force Taf.

Specifically, the base target torque calculation processing M20 is processing of variably setting an absolute value of the base target torque Thb* in accordance with the vehicle speed V, even when an absolute value of the axial force Taf is the same. This processing may be processing of calculating the absolute value of the base target torque Thb* when the vehicle speed V is small, so as to be no greater than the absolute value of the base target torque Thb* in a case in which the vehicle speed V is great. This can be realized through map computation of the base target torque Thb* performed by the PU 72, in a state in which map data is stored in the storage device 74 in advance, for example. The map data is data in which the axial force Taf or a lateral acceleration comprehended from the axial force Taf, and the vehicle speed V, are input variables, and the base target torque Thb* is an output variable.

Note that map data is a set of data that includes discrete values of the input variables and values of the output variable corresponding to respective values of the input variables. Also, map computation may be processing in which, in a case of a value of an input variable matching any of the values of the input variables of the map data, the corresponding value of the output variable of the map data is taken as the computation result. Also, map computation may be processing in which, in a case of the value of the input variable not matching any of the values of input variables of the map data, a value obtained by interpolating a plurality of values of output variables included in the map data is taken as the computation result. Alternatively, map computation may be processing in which, in a case of the value of the input variable not matching any of the values of input variables of the map data, a value of an output variable in the map data that corresponds most closely, out of a plurality of values of output variables included in the map data, is taken as the computation result.

Hysteresis processing M22 is processing of calculating and outputting a hysteresis correction amount Thys for correcting the base target torque Thb* based on the steering angle $\theta h$. More specifically, the hysteresis processing M22 includes processing of calculating the hysteresis correction amount Thys by identifying turning and returning of the steering wheel 12 based on variations in the steering angle $\theta h$, and so forth. More specifically, the hysteresis processing M22 includes processing of calculating the hysteresis correction amount Thys such that the absolute value of the target steering torque Th* is greater when turning, as compared to that when returning. The hysteresis processing M22 includes processing of variably setting the hysteresis correction amount Thys according to the vehicle speed V.

Addition processing M24 is processing of calculating the target steering torque Th* by adding the hysteresis correction amount Thys to the base target torque Thb*. Target reaction force calculation processing M26 is processing of calculating a target reaction force Ts* corresponding to the steering reaction force to be applied to the steering wheel 12, using the steering torque Th and the target steering torque Th* as inputs. The target reaction force Ts* is actually a command value for the reaction force motor 20. The steering reaction force is a value that is obtained by multiplying the target reaction force Ts* by a coefficient that corresponds to the reduction ratio of the speed reduction mechanism 16.

Reaction force operation processing M30 is processing of outputting the operation signal MSs for the reaction force inverter 22 using the target reaction force Ts*, the currents iu1, iv1, and iw1, and the rotational angle $\theta a$ as inputs. The reaction force operation processing M30 includes processing of calculating dq-axis current command values based on the target reaction force Ts*. The reaction force operation processing M30 also includes processing of calculating dq-axis currents based on the currents iu1, iv1, and iw1 and the rotational angle $\theta a$. The reaction force operation processing M30 also includes processing of calculating the operation signal MSs, in order to operate the reaction force inverter 22 such that the dq-axis currents are brought to the command values.

Figure 3:
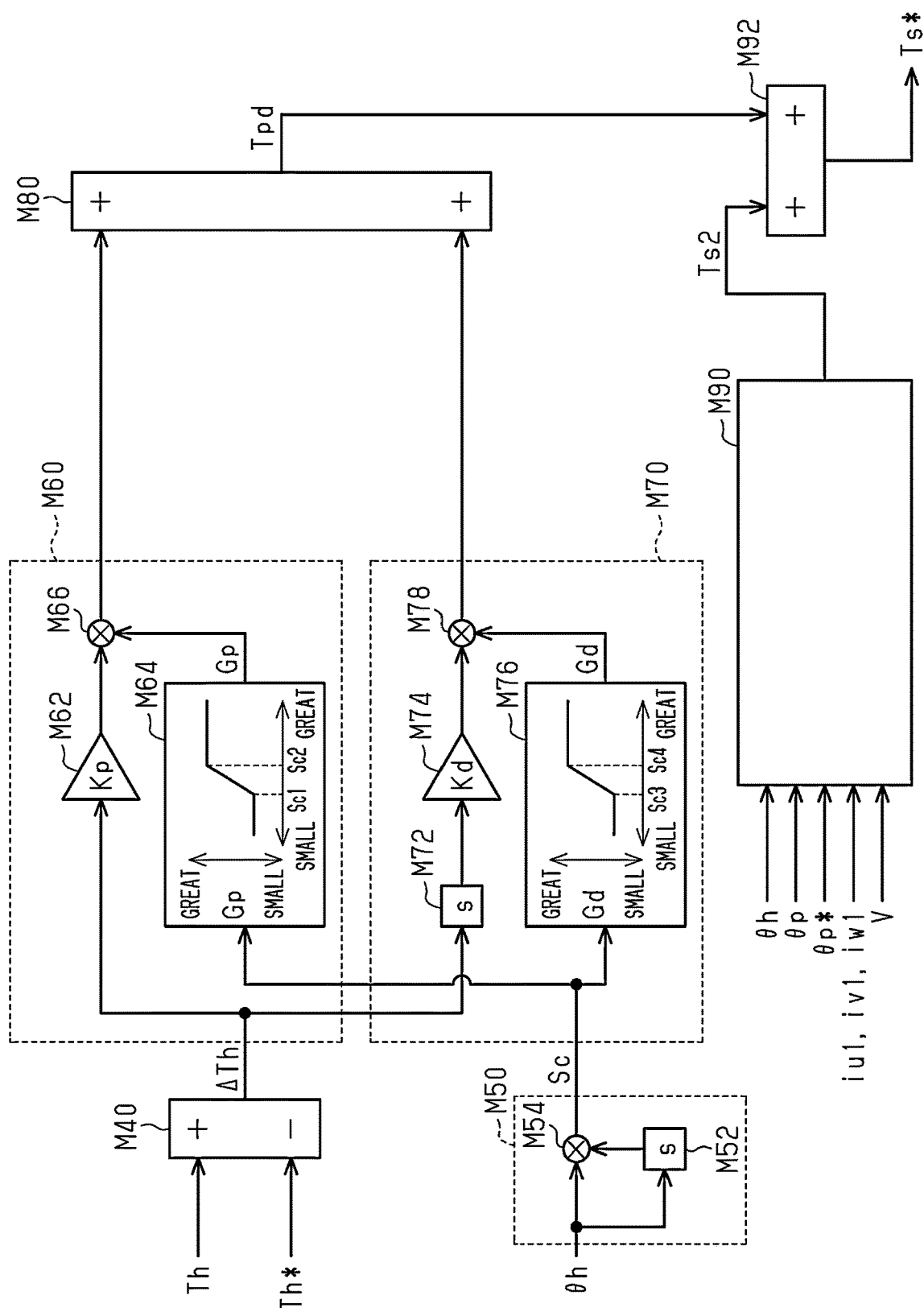
FIG. 3 is a block diagram illustrating details of part of processing executed by the control device according to the first embodiment.

FIG. 3 illustrates details of the target reaction force calculation processing M26.

Deviation calculation processing M40 is processing of calculating a torque deviation $\Delta Th$, which is a value obtained by subtracting the target steering torque Th* from the steering torque Th.

Operation state identification processing M50 is processing of identifying the operation state of the steering wheel 12. The operation state identification processing M50 includes a linear operator M52 and multiplication processing M54. The linear operator M52 is processing of calculating and outputting a first-order time-differential value of the steering angle $\theta h$. The multiplication processing M54 is processing of multiplying the steering angle $\theta h$ by the output value of the linear operator M52 and substituting the obtained value for a state identification variable Sc. In a first operation state in which the steering wheel 12 is operated away from the neutral position, the sign of the steering angle $\theta h$ and the sign of the first-order time-differential value of the steering angle $\theta h$ are the same. Accordingly, in the first operation state, the state identification variable Sc is positive. Conversely, in a second operation state in which the steering wheel 12 is operated toward the neutral position, the sign of the steering angle $\theta h$ and the sign of the first-order time-differential value of the steering angle $\theta h$ are opposite to each other. Accordingly, in the second operation state, the state identification variable Sc is negative.

A proportional element M60 is processing that takes the torque deviation $\Delta Th$ as an input, and outputs a value that is proportional to the torque deviation $\Delta Th$. More specifically, proportional gain multiplication processing M62 is processing of multiplying the torque deviation $\Delta Th$ by a proportional gain Kp. Proportional variable gain calculation processing M64 is processing of calculating a proportional variable gain Gp using the value of the state identification variable Sc as an input. The proportional variable gain calculation processing M64 is processing of setting the proportional variable gain Gp in a case in which the value of the state identification variable Sc is great, so as to be no less than the proportional variable gain Gp in a case in which the value of the state identification variable Sc is small. This processing may be, for example, processing in which the PU 72 performs map computation of the proportional variable gain Gp in a state in which map data is stored in the storage device 74. Here, the map data is data in which the value of the state identification variable Sc is taken as an input variable, and also the value of the proportional variable gain Gp is used as an output variable.

In detail, the proportional variable gain Gp has one constant value in a case in which the value of the state identification variable Sc is no greater than a first threshold value Sc1, and another different constant value in a case in which the value of the state identification variable Sc is no smaller than a second threshold value Sc2. Also, when the proportional variable gain Gp is greater than the first threshold value Sc1 and smaller in a case in which the second threshold value Sc2, the proportional variable gain Gp becomes a value that monotonically increases in accordance with the value of the state identification variable Sc.

Proportional variable gain multiplication processing M66 is processing of multiplying the output value of the proportional gain multiplication processing M62 by the proportional variable gain Gp. The output value of the proportional variable gain multiplication processing M66 is the output value of the proportional element M60. That is to say, gain of the proportional element M60 is a value obtained by multiplying the proportional gain Kp by the proportional variable gain Gp.

A differential element M70 is processing that takes the torque deviation ΔTh as an input, and outputs a value that is proportional to a first-order time-differential value of the torque deviation ΔTh. Specifically, a linear operator M72 is processing of calculating a first-order time-differential value of the torque deviation ΔTh. Differential gain multiplication processing M74 is processing of multiplying the output value of the linear operator M72 by a differential gain Kd. Differential variable gain calculation processing M76 is processing of calculating a differential variable gain Gd using the value of the state identification variable Sc as an input. The differential variable gain calculation processing M76 is processing of setting the differential variable gain Gd when the value of the state identification variable Sc is great, so as to be no less than the differential variable gain Gd in a case in which the value of the state identification variable Sc is small. This processing may be, for example, processing in which the PU 72 performs map computation of the differential variable gain Gd in a state in which map data is stored in the storage device 74. Here, the map data is data in which the value of the state identification variable Sc is taken as an input variable, and also the value of the differential variable gain Gd is used as an output variable.

In detail, the differential variable gain Gd has one constant value in a case in which the value of the state identification variable Sc is no greater than a third threshold value Sc3, and another different constant value in a case in which the value of the state identification variable Sc is no smaller than a fourth threshold value Sc4. Also, in a case in which the differential variable gain Gd is greater than the third threshold value Sc3 and smaller than the fourth threshold value Sc4, the proportional variable gain Gp becomes a value that monotonically increases in accordance with the value of the state identification variable Sc. Note that the first threshold value Sc1 and the third threshold value Sc3 may be the same. Also, the second threshold value Sc2 and the fourth threshold value Sc4 may be the same.

Differential variable gain multiplication processing M78 is processing of multiplying the output value of the differential gain multiplication processing M74 by the differential variable gain Gd. The output value of the differential variable gain multiplication processing M78 is the output value of the differential element M70. That is to say, the product of the differential gain Kd and the differential variable gain Gd becomes the gain of the differential element M70.

Addition processing M80 is processing of adding the output value of the proportional element M60 and the output value of the differential element M70, and outputting the added value as PD manipulated variable Tpd.

Second manipulated variable calculation processing M90 is processing of calculating a manipulated variable other than the PD manipulated variable Tpd, for controlling the steering torque Th to the target steering torque Th*. The second manipulated variable calculation processing M90 may include, for example, at least one of the processing (A) to (H) described below.

Processing (A) is processing of calculating a manipulated variable corresponding to a cumulative value of a value obtained by subtracting the steering torque Th from an estimated axial force. The estimated axial force is a value that is equivalent to the torque of the reaction force motor 20. The estimated axial force is a value calculated by the PU 72 by inputting the currents iu1, iv1, and iw1.

Processing (B) is processing in which a cumulative value of a value obtained by multiplying the difference between the steering torque Th and the target steering torque Th* by an integral gain is taken as the manipulated variable. Processing (C) is processing of calculating a manipulated variable for controlling the steering torque estimated by a disturbance observer to the target steering torque Th*. The processing (C) takes as input the steering angle θh, the torque of the reaction force motor 20 calculated from the currents iu1, iv1, and iw1, and so forth.

Processing (D) is processing of calculating an open loop manipulated variable in which the steering torque Th is taken as an input.

Processing (E) is processing of calculating an open loop manipulated variable in which the target steering torque Th* is taken as an input.

Processing (F) is processing of, in a case in which the magnitude of the pinion angle θp is no smaller than a predetermined value, calculating a manipulated variable for applying a force to the steering shaft 14 to counter the magnitude of the pinion angle θp from becoming any greater.

Processing (G) is processing of, in a case in which the magnitude of the steering angle θh is no smaller than a predetermined value, calculating a manipulated variable for applying a force to the steering shaft 14 to counter the magnitude of the steering angle θh from becoming any greater.

Processing (H) is processing of calculating a manipulated variable for controlling the steering angle θh to a converted steering angle obtained by converting the pinion angle θp into the steering angle θh through feedback control. Note that the converted steering angle is calculated by the PU 72 based on the steering angle ratio and the pinion angle θp that are determined in the target pinion angle calculation processing M14 in accordance with the vehicle speed V.

Addition processing M92 is processing of calculating a target reaction force Ts* by adding the PD manipulated variable Tpd and a second manipulated variable Ts2 output by the second manipulated variable calculation processing M90.

<Functions and Effects of Present Embodiment>

Figures 4A, 4B:
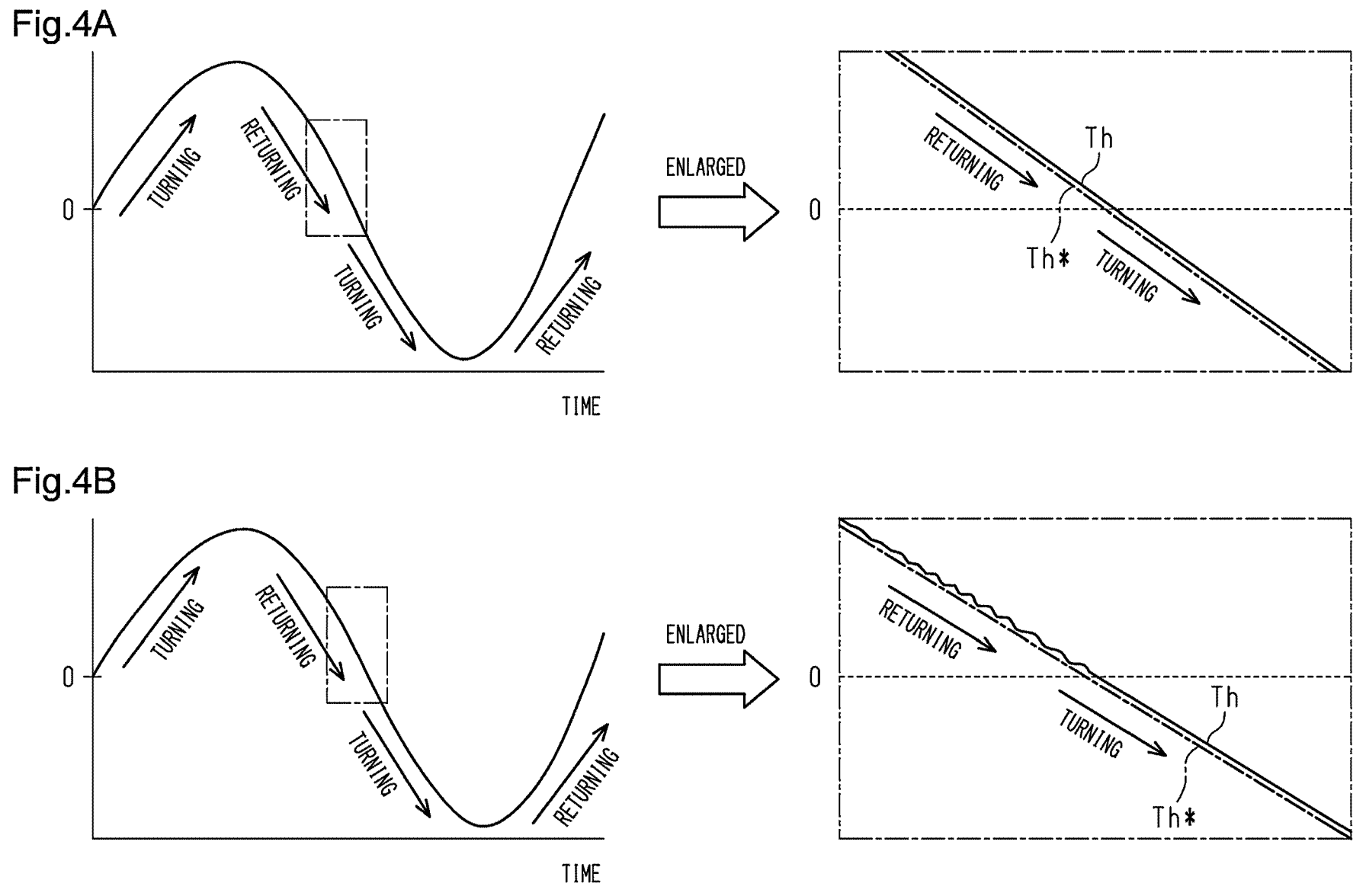

FIG. 4A and FIG. 4B show examples of control of the steering torque Th according to the present embodiment and a comparative example. In FIG. 4A and FIG. 4B, the continuous lines indicate the transition of the steering torque Th. In FIG. 4, the long dashed short dashed line indicates the transition of the target steering torque Th*. FIG. 4A shows the transition of the steering torque Th and the target steering torque Th* according to the present embodiment. FIG. 4B shows the transition of the steering torque Th and the target steering torque Th* in the comparative example. The comparative example is an example in which the output value of the proportional gain multiplication processing M62 is set as the output value of the proportional element M60, and also the output value of the differential gain multiplication processing M74 is set as the output value of the differential element M70, in the processing of FIG. 3. Also, in FIG. 4A and FIG. 4B, in a case in which the steering wheel 12 is operated away from the neutral position, this is described as "turning," and when the steering wheel 12 is operated toward the neutral position, this is described as "returning."

As shown in FIG. 4B, in the comparative example, the steering torque Th vibrates when returning. That is to say, in the comparative example, control of the steering torque Th is unstable when returning, as compared to when turning. Now, in a case in which the proportional gain Kp and the differential gain Kd are reduced in order to suppress instability when returning, the responsivity decreases.

Accordingly, the PU 72 distinguishes between turning and returning in accordance with the value of the state identification variable Sc. When returning, the PU 72 reduces the proportional variable gain Gp and the differential variable gain Gd as compared to when turning. This enables control of the steering torque Th to be suppressed from becoming unstable when returning. Moreover, high responsivity when turning can be maintained.

Thus, according to the present embodiment, a suitable compromise between stability and responsivity of the feedback control of the steering torque Th can be found. According to the embodiment described above, the functions and effects described below can be further obtained.

(1-1) The state identification variable Sc is made up of the product of the steering angle $\theta h$ and the steering angle speed. Thus, the state identification variable Sc is positive when turning, whereas the state identification variable Sc is negative when returning. Accordingly, the state identification variable Sc can be a variable of which the sign differs in accordance with whether turning or returning.

(1-2) The state identification variable Sc is a variable that can take on values of different magnitudes even when the value has the same sign. Thus, even when the sign of the state identification variable Sc is the same, the gain of the proportional element M60 and the gain of the differential element M70 can be monotonically increased in accordance with the value thereof. Accordingly, sudden change in gain can be suppressed.

(1-3) Change in the gain in accordance with the turning and returning of the steering wheel is executed in both the proportional element M60 and the differential element M70. This increases the degree of freedom in designing the feedback control of the steering torque Th, thereby enabling more appropriate setting thereof in terms of achieving both stability and responsivity, as compared to a case in which only one thereof is made to be variable.

(1-4) The PU 72 operates the reaction force inverter 22 in a state in which the steering wheel 12 and the steered wheels 44 are mechanically separated. In other words, the control illustrated in FIG. 3 is employed in a steer-by-wire type steering device. Even though a controller may not generate vibrations in a system in which the steering wheel 12 and the steered wheels 44 are mechanically linked, vibrations may still occur therein in a steer-by-wire type steering device. Accordingly, the control illustrated in FIG. 3 is particularly useful.

Note that it is presumed that the reason why vibrations are likely to occur in a steer-by-wire steering device is that in a case in which the magnitude of the steering torque Th is great enough to overcome a friction component, the load applied to the steering wheel 12 is small. That is to say, in a case in which the steering wheel 12 and the steered wheels 44 are mechanically linked to each other, the load torque from the steered wheels 44 is applied to the steering wheel 12. It is presumed that this load torque tends to suppress occurrence of vibration.

Second Embodiment

A second embodiment will be described below with reference to the drawings, primarily regarding points of difference with respect to the first embodiment.

Figure 5:
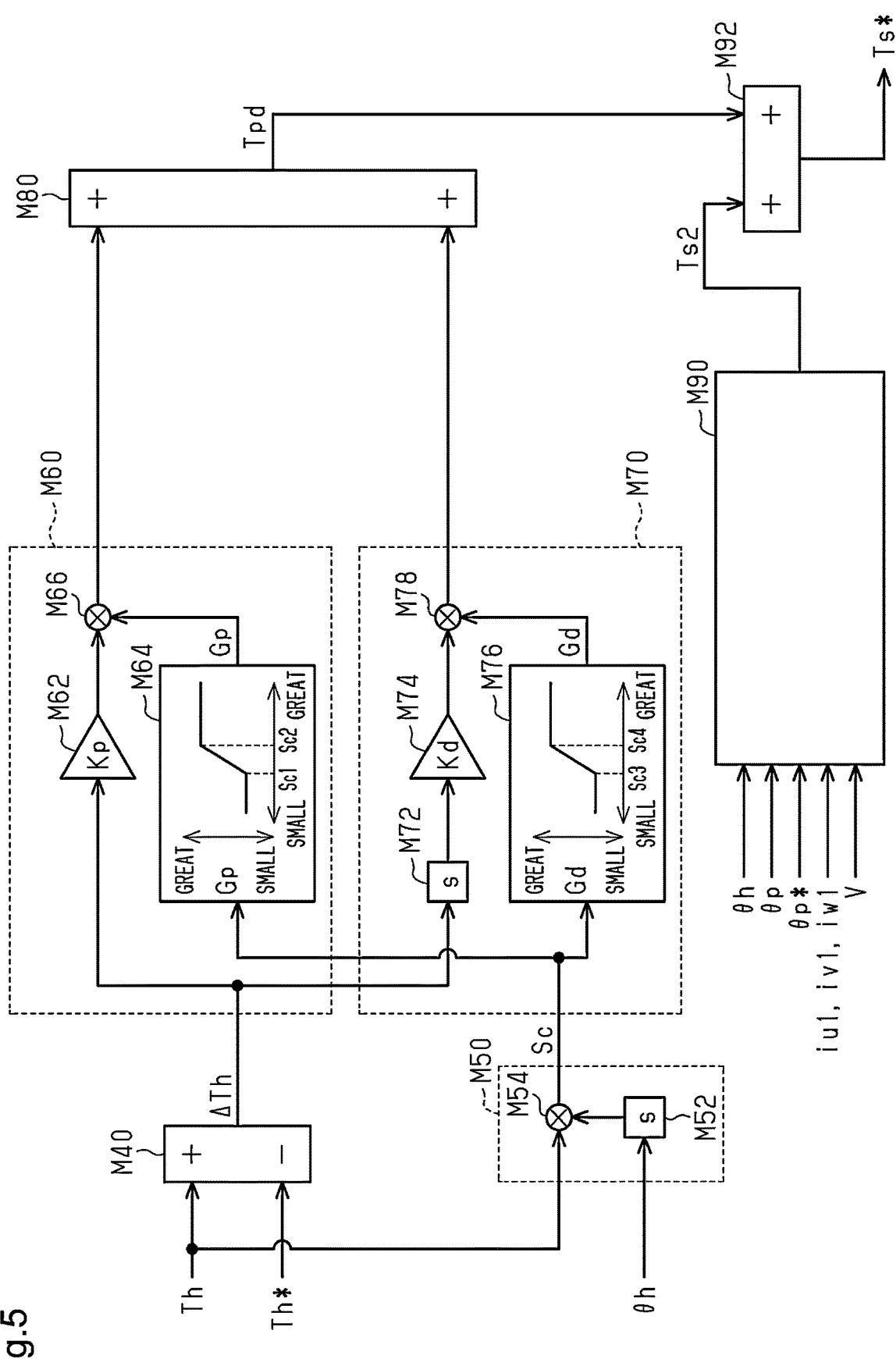
FIG. 5 is a block diagram illustrating details of part of processing executed by a control device according to a second embodiment.

FIG. 5 illustrates details of the target reaction force calculation processing M26 according to the present embodiment. Note that in FIG. 5, processing corresponding to the processing illustrated in FIG. 3 is denoted by the same signs, for convenience. As illustrated in FIG. 5, according to the present embodiment, in the operation state identification processing M50, the multiplication processing M54 multiplies the steering torque Th by the steering angle speed which is the output value of the linear operator M52. In the present embodiment, the output value of the multiplication processing M54 is the state identification variable Sc.

<Functions and Effects of Second Embodiment>

The PU 72 substitutes the product of the steering angle speed and the steering torque Th for the state identification variable Sc. Here, when turning, the sign of the steering angle speed and the sign of the steering torque Th are equal. Therefore, when turning, the sign of the state identification variable Sc is positive. On the other hand, when returning, the steering torque Th is normally applied so as to apply braking to the steering wheel 12 so as not to return to the neutral position. Accordingly, when returning, the sign of the steering angle speed and the sign of the steering torque Th are opposite to each other. Accordingly, when returning, the sign of the state identification variable Sc is negative. Thus, according to the present embodiment, turning and returning can be distinguished in accordance with the sign of the state identification variable Sc.

According to the present embodiment described above, effects in accordance with those of (1-2) and (1-3) of the first embodiment can be further obtained.

Third Embodiment

A third embodiment will be described below with reference to the drawings, primarily regarding points of difference with respect to the first embodiment.

Figure 6:
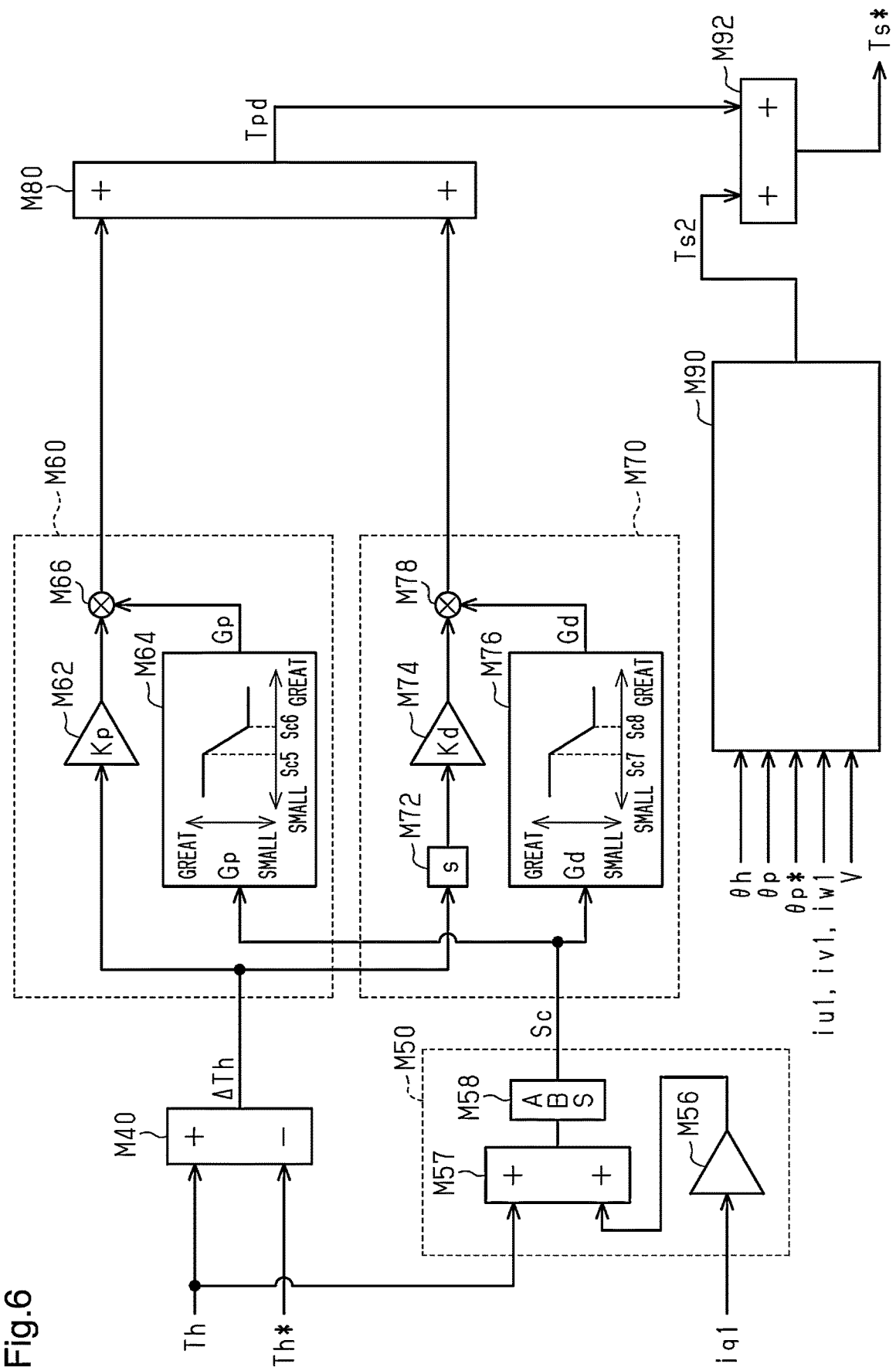
FIG. 6 is a block diagram illustrating details of part of processing executed by a control device according to a third embodiment.

FIG. 6 illustrates details of the target reaction force calculation processing M26 according to the present embodiment. Note that in FIG. 6, processing corresponding to the processing illustrated in FIG. 3 is denoted by the same signs, for convenience. As illustrated in FIG. 6, according to the present embodiment, the operation state identification processing M50 includes conversion coefficient multiplication processing M56, addition processing M57, and absolute value calculation processing M58. The conversion coefficient multiplication processing M56 is processing that converts q-axis current iq1 into the torque that the reaction force motor 20 applies to the steering shaft 14. The q-axis current iq1 is a q-axis component of the current flowing through the reaction force motor 20. The q-axis current iq1 is calculated by the PU 72 based on the currents iu1, iv1, and iw1.

The addition processing M57 is processing of adding the output value of the conversion coefficient multiplication processing M56 and the steering torque Th. The absolute value calculation processing M58 is processing of calculating the absolute value of the output value of the addition processing M57. The output value of the absolute value calculation processing M58 is the value of the state identification variable Sc.

The proportional variable gain calculation processing M64 of the proportional element M60 sets the proportional variable gain Gp in a case in which the value of the state identification variable Sc is great to be no greater than the value of the proportional variable gain Gp in a case in which the value of the state identification variable Sc is small. This processing may be, for example, processing in which the PU 72 performs map computation of the proportional variable gain Gp in a state in which map data is stored in the storage device 74. Here, the map data is data in which the value of the state identification variable Sc is taken as an input variable, and also the value of the proportional variable gain Gp is used as an output variable.

In detail, the proportional variable gain Gp has one constant value in a case in which the value of the state identification variable Sc is no greater than a fifth threshold value Sc5, and another different constant value in a case in which the value of the state identification variable Sc is no smaller than a sixth threshold value Sc6. Also, in a case in which the proportional variable gain Gp is greater than the fifth threshold value Sc5 and smaller than the sixth threshold value Sc6, the proportional variable gain Gp becomes a value that monotonically increases in accordance with the value of the state identification variable Sc.

The differential variable gain calculation processing M76 is processing of setting the differential variable gain Gd in a case in which the value of the state identification variable Sc is great, so as to be no greater than the differential variable gain Gd in a case in which the value of the state identification variable Sc is small. This processing may be, for example, processing in which the PU 72 performs map computation of the differential variable gain Gd in a state in which map data is stored in the storage device 74. Here, the map data is data in which the value of the state identification variable Sc is taken as an input variable, and also the value of the differential variable gain Gd is used as an output variable.

In detail, the differential variable gain Gd has one constant value in a case in which the value of the state identification variable Sc is no greater than a seventh threshold value Sc7, and another different constant value in a case in which the value of the state identification variable Sc is no smaller than an eighth threshold value Sc8. Also, in a case in which the differential variable gain Gd is greater than the seventh threshold value Sc7 and smaller than the eighth threshold value Sc8, the differential variable gain Gd becomes a value that monotonically increases in accordance with the value of the state identification variable Sc. Note that the fifth threshold value Sc5 and the seventh threshold value Sc7 may be the same. Also, the sixth threshold value Sc6 and the eighth threshold value Sc8 may be the same.

<Functions and Effects of Third Embodiment>

The PU 72 sets the absolute value of the sum of the torque applied by the reaction force motor 20 to the steering shaft 14 and the steering torque Th as the value of the state identification variable Sc. Accordingly, in a case in which the torque applied to the steering shaft 14 by the reaction force motor 20 and the steering torque Th are approximately equal in magnitude, the value of the state identification variable Sc is close to zero. On the other hand, in a case in which the driver causes great displacement of the steering wheel 12, the steering torque Th becomes greater than the torque that the reaction force motor 20 applies to the steering shaft 14 by a certain value or more. Accordingly, the value of the state identification variable Sc becomes greater than zero by a certain value or more.

The state in which the steering torque Th is greater than the torque applied to the steering shaft 14 by the reaction force motor 20 by a certain value or more corresponds to the state in which the steering torque Th has overcome the friction applied to the steering shaft 14. In other words, this corresponds to a state in which the degree of influence of friction is small. Also, in a state in which friction has been completely overcome, the feedback control of the steering torque Th is likely to become unstable. Accordingly, when the value of the state identification variable Sc becomes great, the PU 72 reduces the gain of the proportional element M60 and the gain of the differential element M70. This enables stability to be ensured in a state in which friction has been completely overcome. Also, in a state before friction is overcome, the gain of the proportional element M60 and the gain of the differential element M70 are increased. In other words, in a state in which the degree of influence of friction is great, the gain of the proportional element M60 and the gain of the differential element M70 are increased. This enables responsivity to be improved in a state in which the degree of influence of friction is great.

Thus, according to the present embodiment, a suitable compromise between stability and responsivity of the feedback control of the steering torque Th can be found.

According to the present embodiment described above, the functions and effects described below can further be obtained in addition to the effects in accordance with the effects of (1-3) above.

(3-1) The value of the state identification variable Sc is a variable that can take three or more values. This enables the gain of the proportional element M60 and the gain of the differential element M70 to be monotonically reduced in accordance with the value of the state identification variable Sc. Accordingly, sudden change in gain can be suppressed.

Fourth Embodiment

A fourth embodiment will be described below with reference to the drawings, primarily regarding points of difference with respect to the first embodiment.

Figure 7:
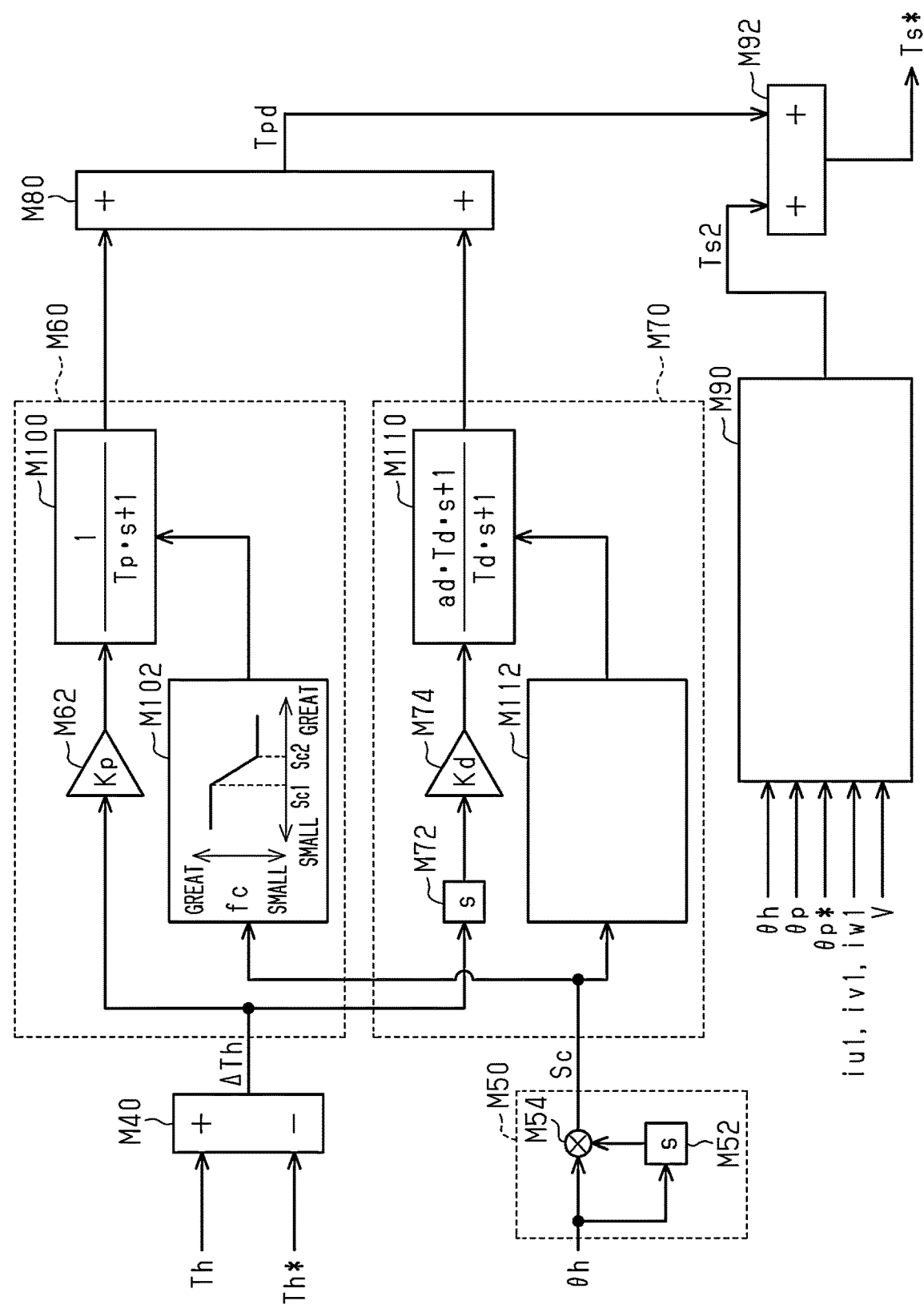
FIG. 7 is a block diagram illustrating details of part of processing executed by a control device according to a fourth embodiment.

FIG. 7 illustrates details of the target reaction force calculation processing M26 according to the present embodiment. Note that in FIG. 7, processing corresponding to the processing illustrated in FIG. 3 is denoted by the same signs, for convenience. As illustrated in FIG. 7, the proportional element M60 includes a proportional phase controller M100 and proportional characteristic variable processing M102. The proportional phase controller M100 performs low-pass filtering processing on the output value of the proportional gain multiplication processing M62. Specifically, the proportional phase controller M100 is a first-order lag filter as described below.

$$1/(Tp \cdot s + 1)$$

Note that "Tp" is a time constant, and "s" is a linear operator indicating a first-order time derivative. The output value of the proportional phase controller M100 is the output value of the proportional element M60.

The proportional characteristic variable processing M102 is processing of changing the characteristic of the proportional phase controller M100 in accordance with the value of the state identification variable Sc. In detail, the proportional characteristic variable processing M102 changes a cutoff frequency fc of the proportional phase controller M100 in accordance with the value of the state identification variable Sc. This processing may be, for example, processing in which the PU 72 performs map computation of the time constant Tp, in a state in which map data is stored in the storage device 74. Here, the map data is data in which the value of the state identification variable Sc is an input variable, and also the value of the time constant Tp is an output variable.

In detail, the cutoff frequency fc has one constant value in a case in which the value of the state identification variable Sc is no greater than the first threshold value Sc1, and another different constant value in a case in which the value of the state identification variable Sc is no smaller than the second threshold value Sc2. Also, in a case in which the cutoff frequency fc is higher than the first threshold value Sc1 and lower than the second threshold value Sc2, the cutoff frequency fc becomes a value that monotonically decreases in accordance with the value of the state identification variable Sc.

The differential element M70 includes a differential phase controller M110 and differential characteristic variable processing M112. The differential phase controller M110 is processing for advancing or delaying the phase of a predetermined frequency component of the output value of the differential gain multiplication processing M74. The differential phase controller M110 is a phase controller with zero order difference as shown below.

$$\{ad \cdot Td \cdot s + 1\}/(Td \cdot s + 1)$$

Here, "Td" is a time constant. Here, in a case in which "ad>1," the phase of a predetermined frequency component can be advanced.

The differential characteristic variable processing M112 is processing of changing characteristics of the differential phase controller M110 in accordance with the value of the state identification variable Sc. In detail, the differential characteristic variable processing M112 varies the predetermined frequency component in accordance with the value of the state identification variable Sc. This processing may be, for example, processing in which the PU 72 performs map computation regarding a time constant Td or a variable ad, in a state in which map data is stored in the storage device 74. Now, the map data is data in which the value of the state identification variable Sc is taken as an input variable, and also the value of the time constant Td or the variable ad is taken as an output variable.

<Functions and Effects of Fourth Embodiment>

When the value of the state identification variable Sc becomes small, the PU 72 raises the cutoff frequency fc in the proportional element M60. This enables responsivity to be suppressed when returning, and ensure stability. Also, when the value of the state identification variable Sc becomes great, the PU 72 lowers the cutoff frequency fc. This enables responsivity to be raised when turning.

Thus, according to the present embodiment, a suitable compromise between stability and responsivity of the feedback control of the steering torque Th can be found.

According to the present embodiment described above, the functions and effects described below can further be obtained in addition to the effects in accordance with the effects of (1-1) above.

(4-1) Changing of characteristics of the frequency controller in accordance with turning and returning is executed by both the proportional element M60 and the differential element M70. This increases the degree of freedom in designing the feedback control of the steering torque Th, thereby enabling more appropriate setting thereof in terms of achieving both stability and responsivity, as compared to a case in which only one thereof is made to be variable.

Fifth Embodiment

A fifth embodiment will be described below with reference to the drawings, primarily regarding points of difference with respect to the fourth embodiment.

Figure 8:
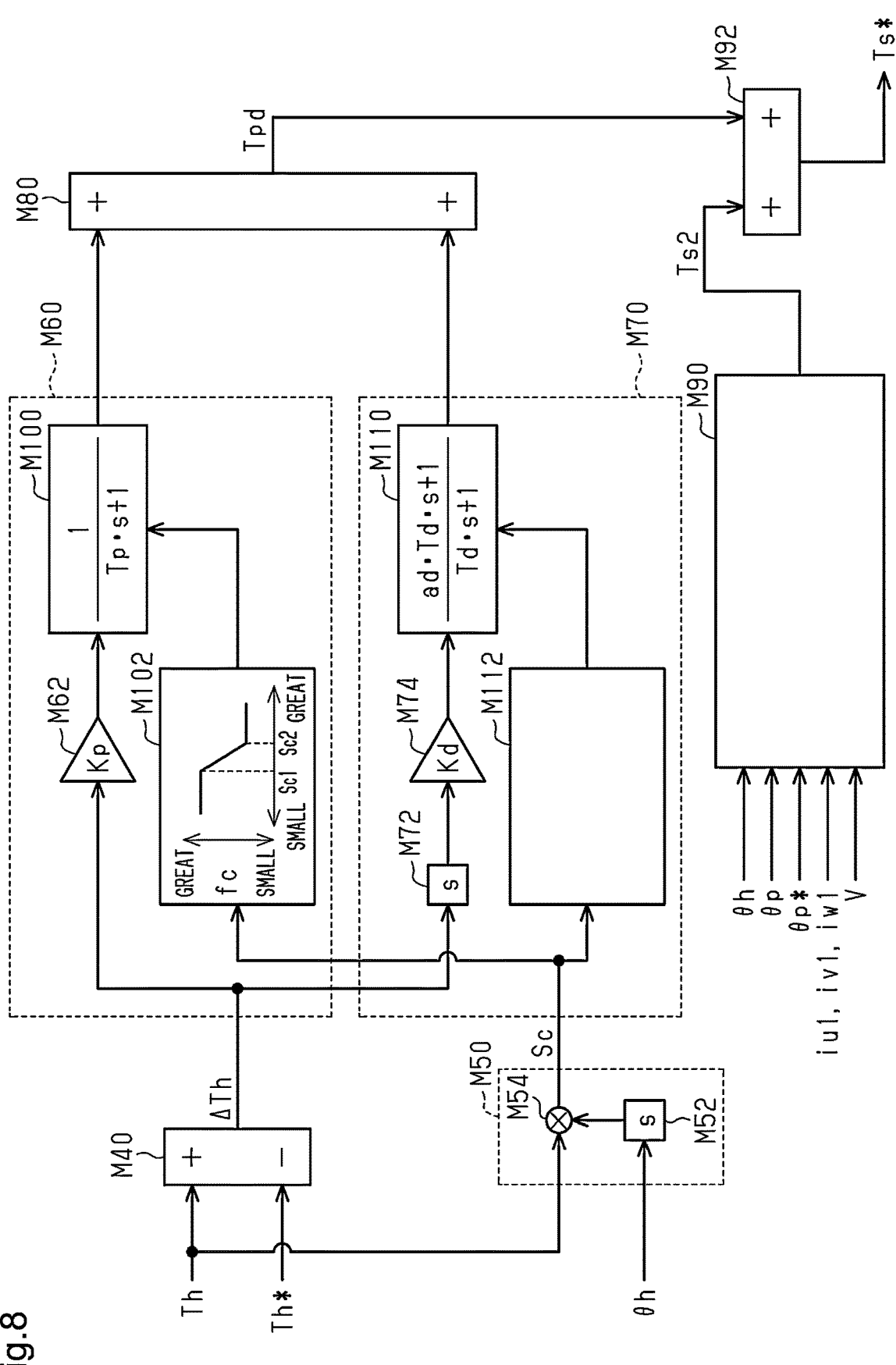
FIG. 8 is a block diagram illustrating details of part of processing executed by a control device according to a fifth embodiment.

FIG. 8 illustrates details of the target reaction force calculation processing M26 according to the present embodiment. Note that in FIG. 8, processing corresponding to the processing illustrated in FIG. 7 is denoted by the same signs, for convenience. As illustrated in FIG. 8, in the present embodiment, the operation state identification processing M50 in the processing illustrated in FIG. 7 is replaced with the processing illustrated in FIG. 5.

Sixth Embodiment

A sixth embodiment will be described below with reference to the drawings, primarily regarding points of difference with respect to the fourth embodiment.

Figure 9:
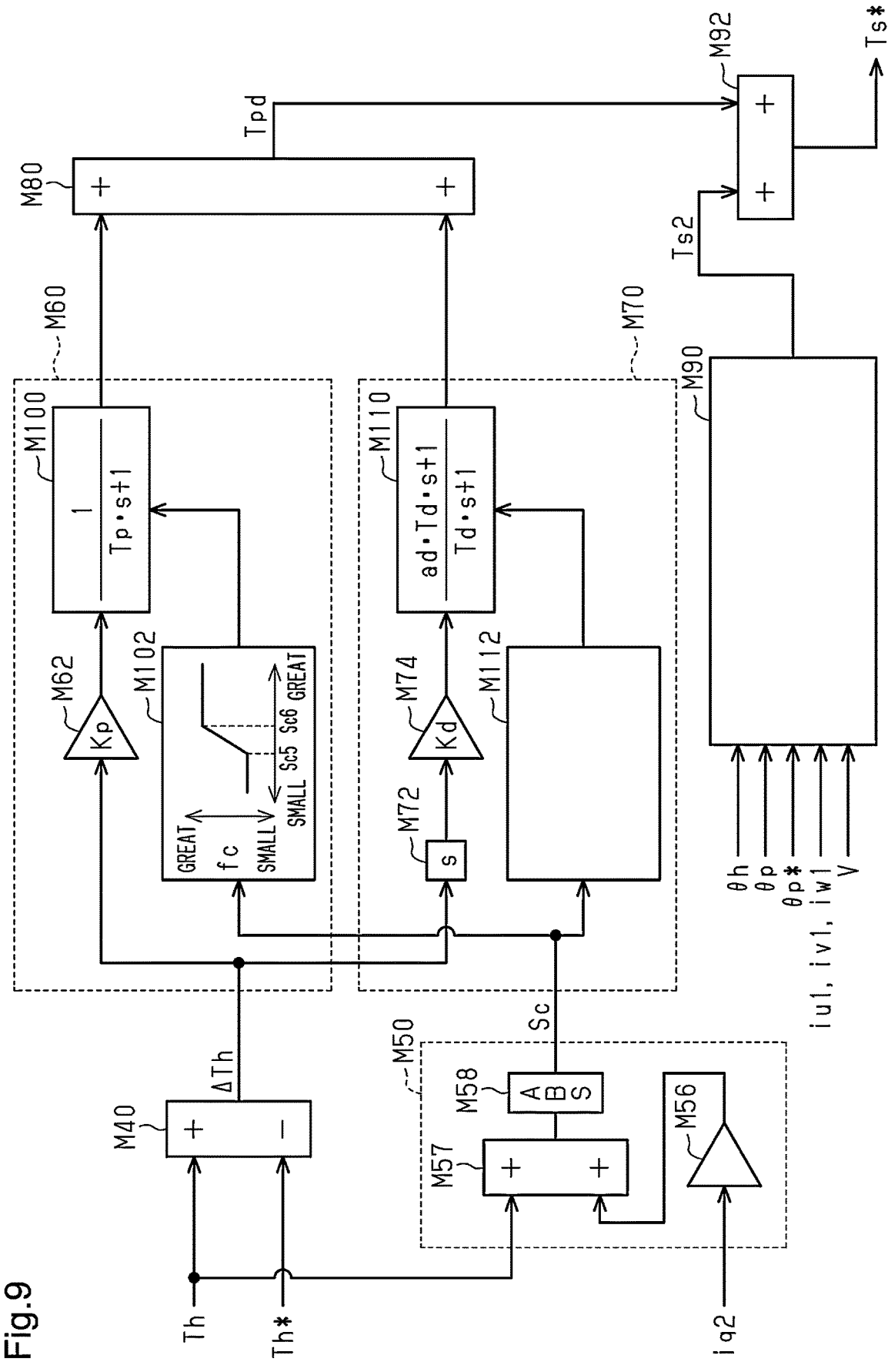
FIG. 9 is a block diagram illustrating details of part of processing executed by a control device according to a sixth embodiment.

FIG. 9 illustrates details of the target reaction force calculation processing M26 according to the present embodiment. Note that in FIG. 9, processing corresponding to the processing illustrated in FIG. 7 is denoted by the same signs, for convenience. As illustrated in FIG. 9, in the present embodiment, the operation state identification processing M50 in the processing illustrated in FIG. 7 is replaced with the processing illustrated in FIG. 6. Also, the proportional characteristic variable processing M102 is processing of setting the value of the cutoff frequency fc in a case in which the value of the state identification variable Sc is great to be no smaller than the value of the cutoff frequency fc when the value of the state identification variable Sc is small. In other words, the cutoff frequency fc in a case in which the degree of influence of friction is large is set to be lower than the cutoff frequency fc in a case in which the degree of influence of friction is small. In detail, the cutoff frequency fc has one constant value which in a case in which the value of the state identification variable Sc is no greater than the fifth threshold value Sc5, and another different constant value when the value of the state identification variable Sc is no smaller than the sixth threshold value Sc6. Also, in a case in which the cutoff frequency fc is higher than the fifth threshold value Sc5 and lower than the sixth threshold value Sc6, the cutoff frequency fc becomes a value that monotonically decreases in accordance with the value of the state identification variable Sc.

Seventh Embodiment

A seventh embodiment will be described below with reference to the drawings, primarily regarding points of difference with respect to the first embodiment.

Figure 10:
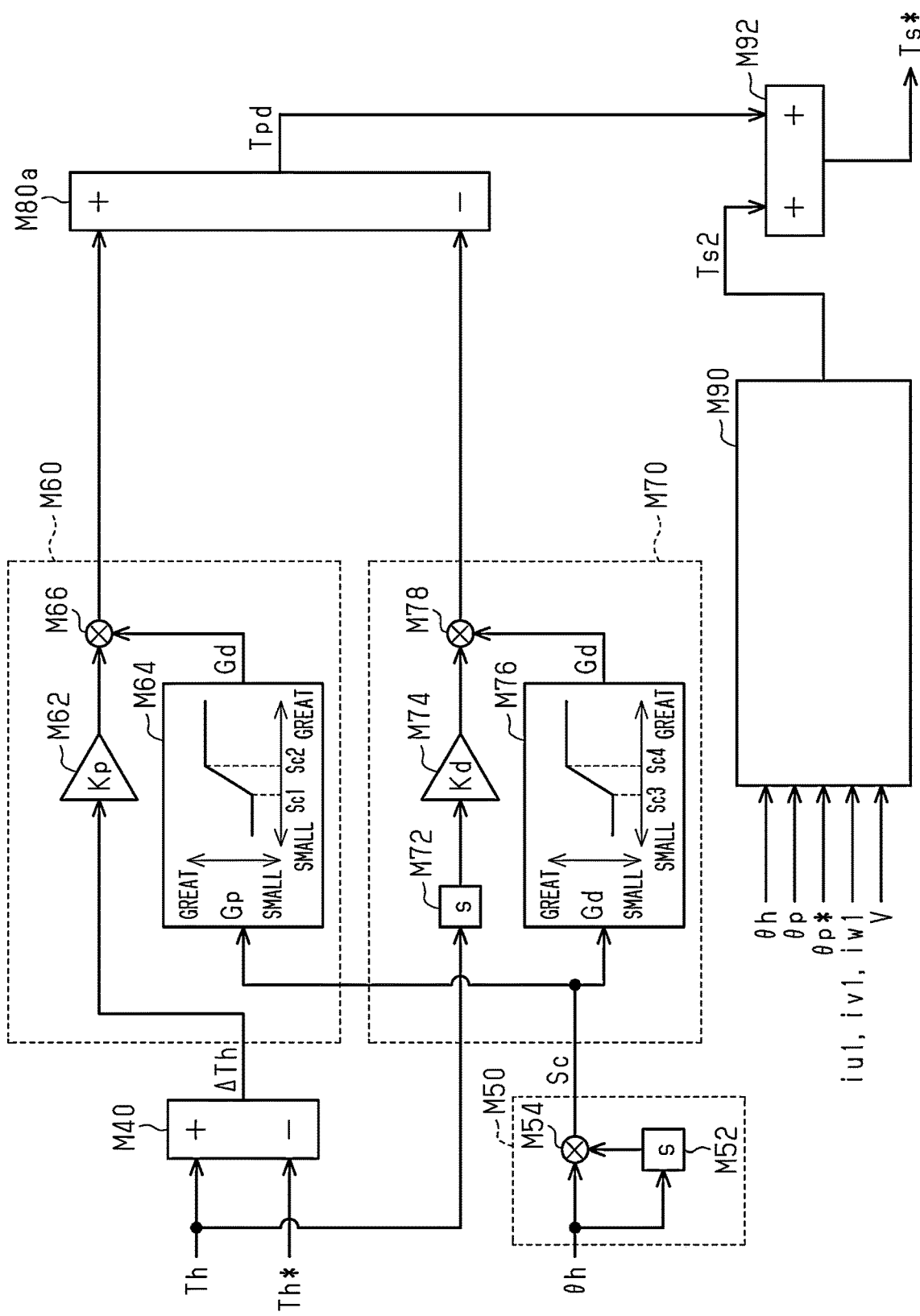
FIG. 10 is a block diagram illustrating details of part of processing executed by a control device according to a seventh embodiment.

FIG. 10 illustrates details of the target reaction force calculation processing M26 according to the present embodiment. Note that in FIG. 10, processing corresponding to the processing illustrated in FIG. 3 is denoted by the same signs, for convenience.

As illustrated in FIG. 10, in the present embodiment, the input of the differential element M70 is the steering torque Th. Accordingly, the linear operator M72 is processing of calculating a first-order time-differential value of the steering torque Th. Further, the differential gain multiplication processing M74 is processing of multiplying the first-order time-differential value of the steering torque Th by the differential gain Kd. Further, the PD manipulated variable Tpd is set to a value obtained by subtracting the output value of the differential element M70 from the output value of the proportional element M60 in subtraction processing M80a.

In this way, the PD manipulated variable Tpd according to the present embodiment is a manipulated variable of derivative leading PD control.

Other Embodiments

Note that the present embodiment can be modified and carried out as follows. The present embodiment and the following modifications can be combined with each other and carried out insofar as no technical contradiction arises.
"Regarding Proportional Elements"
The proportional variable gain multiplication processing M66 may be provided upstream of the proportional gain multiplication processing M62. In other words, the torque deviation ΔTh may be multiplied by the proportional variable gain Gp.
For example, the proportional phase controller M100 may be provided upstream of the proportional gain multiplication processing M62.
The proportional element M60 may be configured including the proportional phase controller M100 but not including the proportional characteristic variable processing M102.
"Regarding Differential Elements"
The differential variable gain multiplication processing M78 may be provided upstream of the differential gain multiplication processing M74. In other words, the output value of the linear operator M72 may be multiplied by the differential variable gain Gd. Also, for example, the differential variable gain multiplication processing M78 may be provided upstream of the linear operator M72. In other words, the torque deviation ΔTh may be multiplied by the differential variable gain Gd.
For example, the differential phase controller M110 may be provided between the linear operator M72 and the differential gain multiplication processing M74. Also, for example, the differential phase controller M110 may be provided upstream of the linear operator M72.
The differential element M70 may include the differential phase controller M110 but not include the differential characteristic variable processing M112.

"Regarding Filtering Processing"
(a) Regarding Proportional Phase Controller
The proportional phase controller is not limited to a first-order lag element. For example, this may be a second-order lag element. Alternatively, the phase controller may have a relative order of 0 as follows.

$$\alpha p \cdot (Tp2 \cdot s+1)/(Tp1 \cdot s+1)$$

where "$\alpha p<1$."
(b) Regarding Differential Phase Controller M110
The differential phase controller is not limited to that exemplified in the above embodiments.
(c) Others
Providing a phase controller in both the proportional element M60 and the differential element M70 is not essential. For example, the controller may adjust the phase of the output value of the addition processing M80 or the phase of the output value of the subtraction processing M80a.
"Regarding Magnitude of Degree of Influence of Friction on Displacement of Operating Member"
The input variables for quantifying the magnitude of the degree of influence of friction on the displacement of the operating member are not limited to the techniques exemplified in the embodiments above. For example, in a case in which reaction force motor 20 is an interior permanent magnet synchronous motor, torque that is estimated from both the q-axis current iq1 and d-axis current id1 may be used as the torque variable. Also, a torque command value for the reaction force motor 20 may be used as the torque variable.
For example, in the case of a steering device in which the steering wheel 12 and the steered wheels 44 are mechanically linked, as described in the section "Regarding Steering Device" below, the following may be performed. That is to say, a variable indicating the degree of influence of friction can be configured based on the absolute value of the sum of the torque of the motor that steers the steered wheels 44, and the steering torque Th.
The variable that quantifies the magnitude of the degree of influence of friction on the displacement of the operating member is not limited to a variable that can take three or more values. For example, the state identification variable Sc may be a binary variable indicating whether or not the output value of the absolute value calculation processing M58 is no smaller than a threshold value.
"Regarding Characteristics Changing Processing"
(a) Regarding Changes to Proportional Element M60
The magnitude relation of the gain of the proportional element M60 in the first operation state and the second operation state is not limited to the settings exemplified in the embodiments above. For example, depending on the characteristics of the steering device, the opposite may be true.
The magnitude relationship between the cutoff frequency fc of the proportional phase controller M100 in the first operation state and the second operation state is not limited to the settings exemplified in the embodiments above. For example, depending on the characteristics of the steering device, the opposite may be true.
The magnitude relation of the gain of the proportional element M60 for cases in which the degree of influence of friction is great and cases in which it is small is not limited to the settings exemplified in the embodiments above. For example, depending on the characteristics of the steering device, the opposite may be true.

The magnitude relationship regarding the cutoff frequency fc of the proportional phase controller M100 for cases in which the degree of influence of friction is great and cases in which it is small is not limited to the settings exemplified in the embodiments above. For example, depending on the characteristics of the steering device, the opposite may be true.

Both changing of the gain of the proportional element M60 regarding the proportional variable gain Gp and changing of the frequency characteristics of the proportional phase controller M100 may be executed.

(b) Regarding Changes to Differential Element M70

The magnitude relation of the gain of the differential element M70 in the first operation state and the second operation state is not limited to the settings exemplified in the embodiments above. For example, depending on the characteristics of the steering device, the opposite may be true.

The magnitude relation of the gain of the differential element M70 for cases in which the degree of influence of friction is great and cases in which it is small is not limited to the settings exemplified in the embodiments above. For example, depending on the characteristics of the steering device, the opposite may be true.

Both changing of the gain of the differential element M70 regarding the differential variable gain Gd and changing of the frequency characteristics of the differential phase controller M110 may be executed.

(c) Others

Processing of changing the gain of the differential element M70 regarding the differential variable gain Gd is not essential to processing of changing the gain of the proportional element M60 regarding the proportional variable gain Gp. That is to say, for example, processing of changing the gain of the proportional element M60 regarding the proportional variable gain Gp may be executed without having to execute processing of changing the gain of the differential element M70 regarding the differential variable gain Gd.

The processing of changing the frequency characteristics of the differential phase controller M110 is not essential to the processing of changing the frequency characteristics of the proportional phase controller M100. That is to say, for example, processing of changing the frequency characteristics of the proportional phase controller M100 may be executed without having to execute the processing of changing the frequency characteristics of the differential phase controller M110.

The processing of changing the responsivity of the feedback control in accordance with the value of the state identification variable Sc is not limited to the processing of adjusting the PD manipulated variable Tpd. For example, the processing may be to adjust the output value of an integral element that outputs a cumulative value of a value obtained by multiplying the torque deviation ΔTh by a gain. In this case, the gain of the integral element may be variably set in accordance with the state identification variable Sc. Also, for example, the output value of the phase controller to which the cumulative value is input may be set as the output value of the integral element, and also the characteristics of the phase controller may be adjusted in accordance with the value of the state identification variable Sc. Also, for example, both the gain and the characteristics of the phase controller may be adjusted in accordance with the state identification variable Sc.

(d) Regarding Techniques for Quantifying Operation State

Instead of defining the state identification variable Sc as the product of the steering angle $\theta h$ and the steering angle speed, the state identification variable Sc may be a binary variable in accordance with the sign of the product of the steering angle $\theta h$ and the steering angular velocity.

Instead of defining the state identification variable Sc as the product of the steering torque Th and the steering angle speed, the state identification variable Sc may be a binary variable in accordance with the sign of the product of the steering torque Th and the steering angular velocity.

The amount of displacement of the steering wheel 12, which is an operating member, is not limited to an amount calculated based on accumulation processing of the rotational angle $\theta a$. For example, this may be a detection value of a steering angle sensor that directly detects the rotational angle of the steering shaft 14. Note that the steering angle sensor may be provided, for example, closer to the steering wheel 12 side than the torque sensor 80.

"Regarding Manipulated Variable for Controlling Steering Torque to Target Steering Torque"

The manipulated variable for controlling the steering torque to the target steering torque is not limited to the target reaction force Ts*. In other words, this is not limited to a target value for torque with respect to the reaction force motor 20. For example, in a case in which the reaction force motor 20 is a surface permanent magnet synchronous motor, this may be a command value for a q-axis current. Also, in a case in which the reaction force motor 20 is an interior permanent magnet synchronous motor, this may be a set of a command value for a d-axis current and a command value for a q-axis current.

The manipulated variable for controlling the steering torque to the target steering torque is not limited to the variable indicating the reaction force applied to the steering wheel 12. For example, in the case of a device that enables power transfer between the steering wheel 12 and the steered wheels 44, as described in the "Regarding Steering System" section below, this is a variable that indicates torque that assists in torque applied to the steering wheel 12 by the driver.

"Regarding Torque Feedback Processing"

Including the second manipulated variable calculation processing M90 is not essential for the target reaction force calculation processing M26, which is torque feedback processing.

"Regarding Calculation Processing of Base Target Torque Thb*"

The processing of calculating the base target torque Thb* using the axial force Taf as an input is not limited to the processing of inputting the vehicle speed V in addition to the axial force Taf.

Calculating the base target torque Thb* with the axial force Taf as an input is not essential. For example, the base target torque Thb* may be calculated taking the steering torque Th and the vehicle speed V as inputs. This can be realized, for example, by the PU 72 performing map computation regarding the base target torque Thb*, in a state in which map data is stored in the storage device 74. Now, the map data is data that takes the steering torque Th and the vehicle speed V as inputs and also the base target torque Thb* as an output variable.

"Regarding Operation Processing"

The control technique for the reaction force motor 20 is not limited to feedback processing of dq-axis currents. For example, it is sufficient to simply control the current that flows through the reaction force motor 20, in a case in which a direct-current motor is employed as the reaction force motor 20 and also an H-bridge circuit is used as the drive circuit.

It is not essential for the operation processing to be processing in which the PD manipulated variable Tpd or the sum of the PD manipulated variable and the second manipulated variable Ts2 is taken as the command value for the reaction force motor 20. For example, processing of calculating a command value for the rotational angle of the reaction force motor 20, taking the PD manipulated variable Tpd or the sum of the PD manipulated variable and the second manipulated variable Ts2 as an input, may be included. This can be done as follows, for example. That is to say, the PU 72 calculates the torque applied to the steering shaft 14 in accordance with the PD manipulated variable Tpd or the sum of the PD manipulated variable and the second manipulated variable Ts2. The steering torque Th may be taken into consideration in this calculation processing. The PU 72 then calculates the rotational angle of the steering shaft 14 by inputting the torque applied to the steering shaft 14 into a model expression of the steering device. The PU 72 calculates a command value for the rotational angle of the reaction force motor 20 in accordance with this rotational angle.

"Regarding Control of Steered Angle"

Instead of the pinion angle feedback processing M16, processing of controlling a detected value of the amount of movement of the steered shaft 40 to a target value may be used. In this case, the control amount and so forth regarding the pinion angle θp in the above embodiments are replaced with control amount and so forth regarding the amount of movement of the steered shaft 40.

It is not essential for control of the steered angle to include processing of calculating a manipulated variable for controlling the control amount indicating the steered angle, such as the pinion angle θp or the like, through feedback control. For example, control for the steered angle may include processing of calculating a manipulated variable for controlling the control amount indicating the steered angle to a target value, through open-loop control. Also, for example, control of the steered angle may include processing of calculating a sum of a manipulated variable for open-loop control and a manipulated variable for feedback control.

The technique of controlling the steering motor 60 is not limited to feedback processing of dq-axis currents. For example, it is sufficient to simply control the current that flows through the steering motor 60, in a case in which a direct-current motor is employed as the steering motor 60 and also an H-bridge circuit is used as the drive circuit.

"Regarding Operating Member"

The operating member to be operated by the driver to steer the vehicle is not limited to the steering wheel 12. For example, the operating member may be a joystick.

"Regarding Motor Mechanically Linked to Operating Member"

(a) Regarding Reaction Force Actuator Ar

The reaction force motor 20 mechanically linked to the steering wheel 12 is not limited to a three-phase brushless motor. For example, this may be a brushed direct-current motor.

(b) Regarding Drive Circuit for Motor

The drive circuit for the motor that is mechanically linked to the operating member is not limited to the reaction force inverter 22. For example, this may be an H-bridge circuit.

(c) Others

It is not essential for the speed reduction mechanism 16 to be provided.

"Regarding Steering Control Device"

The steering control device is not limited to one that includes the PU 72 and the storage device 74, and that executes software processing. For example, the steering control device may include a dedicated hardware circuit such as an ASIC or the like that executes at least a part of the processing executed in the above embodiments. That is to say, the control device may include a processing circuit having any of the following configurations (a) to (c), which are (a) a processing circuit having a processing device that executes all of the above processing in accordance with a program, and a program storage device such as a storage device or the like that stores the program, (b) a processing circuit having a processing device and a program storage device that executes part of the above processing in accordance with a program, and a dedicated hardware circuit that executes the remaining processing, and (c) a processing circuit having a dedicated hardware circuit that executes all of the above processing. Here, there may be a plurality of software execution devices including a processing device and a program storage device. Also, there may be a plurality of dedicated hardware circuits.

"Regarding Steering Actuator"

The steering actuator At that is employed may be one in which the steering motor 60 is disposed coaxially with the steered shaft 40, for example. Alternatively, the steering actuator At that is employed may be one linked to the steered shaft 40 via a belt-type speed reducer that uses a ball screw mechanism, for example.

The steering actuator At is not limited to being configured to drive the right steered wheel 44 and the left steered wheel 44 in conjunction with each other. In other words, the steering actuator At may be able to control the right steered wheel 44 and the left steered wheel 44 independently of each other.

"Regarding Steering Device"

The steering device capable of changing the relation between the steering angle and the steered angle is not limited to a steering system in which power transfer between the steering wheel 12 and the steered wheels 44 is disconnected. For example, the steering device may be configured to be able to change the relation between the steering angle and the steered angle by using a variable gear for a gear that enables power transfer between the steering wheel 12 and the steered wheels 44. Further, the steering device is not limited to a steering device capable of changing the relation between the steering angle and the steered angle. For example, the steering device may be a steering device in which the steering wheel 12 and the steered wheels 44 are mechanically linked to each other.

The invention claimed is:

1. A steering control device configured to operate a motor mechanically linked to an operating member that is operated by a driver to steer a vehicle, wherein:

the steering control device is configured to execute torque feedback processing, operation processing, and characteristics changing processing;

the torque feedback processing includes calculating a manipulated variable for controlling a steering torque to a target steering torque by feedback control;

the steering torque is torque input to the operating member;

the operation processing includes operating a drive circuit of the motor based on the manipulated variable, in a state in which the operating member and steered wheels of the vehicle are mechanically disconnected from each other; and the characteristics changing processing includes changing response characteristics of the feedback control in accordance with an operation state of the operating member by adjusting a parameter of the feedback control, wherein the parameter includes at least one of:

(a) a gain of the feedback control; and (b) in a case where the torque feedback processing includes filter processing, a parameter defining frequency characteristics of the filter processing.

2. The steering control device according to claim 1, wherein the characteristics changing processing includes switching the response characteristics between a first operation state in which the operating member is operated away from a neutral position and a second operation state in which the operating member is operated toward the neutral position.

3. The steering control device according to claim 2, wherein the characteristics changing processing includes identifying the first operation state and the second operation state in accordance with a sign of a product of an amount of displacement of the operating member and a rate of change of the amount of displacement, and also includes processing of switching the response characteristics with a value of the product as an input.

4. The steering control device according to claim 2, wherein the characteristics changing processing includes identifying the first operation state and the second operation state in accordance with a sign of a product of a rate of change of an amount of displacement of the operating member and the steering torque, and also includes switching the response characteristics with a value of the product as an input.

5. The steering control device according to claim 2, wherein:

the torque feedback processing includes calculating the manipulated variable based on an output value of a proportional element of a difference between the steering torque and the target steering torque; and the characteristics changing processing includes making a gain of the proportional element in the first operation state to be greater than a gain of the proportional element in the second operation state.

6. The steering control device according to claim 2, wherein:

the torque feedback processing includes calculating the manipulated variable based on an output value of a differential element; and the characteristics changing processing includes making a gain of the differential element in the first operation state to be greater than a gain of the differential element in the second operation state.

7. The steering control device according to claim 2, wherein:

the torque feedback processing includes filtering processing; and the characteristics changing processing includes making frequency characteristics of the filtering processing in the first operation state to be characteristics that are different from frequency characteristics of the filtering processing in the second operation state.

8. The steering control device according to claim 7, wherein:

the torque feedback processing includes calculating the manipulated variable based on an output value of a proportional element of a difference between the steering torque and the target steering torque;

the filtering processing includes low-pass filtering processing for suppressing high-frequency components of the proportional element; and the characteristics changing processing includes making a cutoff frequency of the low-pass filtering processing in the first operation state to be lower than the cutoff frequency in the second operation state.

9. The steering control device according to claim 1, wherein the characteristics changing processing includes changing the response characteristics in accordance with a magnitude of a degree of influence of friction on displacement of the operating member.

10. The steering control device according to claim 9, wherein the characteristics changing processing includes changing the response characteristics in accordance with an absolute value of a sum of the steering torque and a torque variable of the motor, wherein the greater the absolute value is, the smaller the degree of influence of friction is deemed to be.

11. The steering control device according to claim 9, wherein:

the torque feedback processing includes calculating the manipulated variable based on an output value of a proportional element of a difference between the steering torque and the target steering torque; and the characteristics changing processing includes setting a gain of the proportional element in a case in which the degree of influence is great to be no less than the gain of the proportional element in a case in which the degree of influence is small.

12. The steering control device according to claim 9, wherein:

the torque feedback processing includes calculating the manipulated variable based on an output value of a differential element; and the characteristics changing processing includes setting a gain of the differential element in a case in which the degree of influence is great to be no less than the gain of the differential element in a case in which the degree of influence is small.

13. The steering control device according to claim 9, wherein:

the torque feedback processing includes filtering process-
ing; and the characteristics changing processing includes changing
frequency characteristics of the filtering processing in
accordance with the magnitude of the degree of influ-
ence.

14. The steering control device according to claim 13,
wherein:

the torque feedback processing includes calculating the
manipulated variable based on an output value of a
proportional element of a difference between the steer-
ing torque and the target steering torque;

the filtering processing includes low-pass filtering pro-
cessing for suppressing high-frequency components in
the output value of the proportional element; and the characteristics changing processing includes setting a
cutoff frequency of the low-pass filtering processing in
a case in which the degree of influence is great to be no
greater than the cutoff frequency in a case in which the
degree of influence is small.

15. A steering control method for operating a motor
mechanically linked to an operating member that is operated
by a driver to steer a vehicle, the steering control method comprising torque feedback processing, operation process-
ing, and characteristics changing processing; wherein:

the torque feedback processing includes calculating a
manipulated variable for controlling a steering torque
to a target steering torque by feedback control;

the steering torque is torque input to the operating mem-
ber;

the operation processing includes operating a drive circuit
of the motor based on the manipulated variable, in a
state in which the operating member and steered wheels
of the vehicle are mechanically disconnected from each
other; and the characteristics changing processing includes changing
response characteristics of the feedback control in
accordance with an operation state of the operating
member by adjusting a parameter of the feedback
control, wherein the parameter includes at least one of:

(a) a gain of the feedback control; and (b) in a case where the torque feedback processing
includes filter processing, a parameter defining fre-
quency characteristics of the filter processing.

* * * * *